Aug. 31, 1965  A. VOGT  3,203,080

METHOD FOR WELDING SYMBOLS IN RELIEF OVER A DIAL

Filed Jan. 9, 1962

United States Patent Office 3,203,080
Patented Aug. 31, 1965

3,203,080
METHOD FOR WELDING SYMBOLS IN RELIEF OVER A DIAL
André Vogt, La Chaux-de-Fonds, Switzerland
(150 Nassau St., New York 38, N.Y.)
Filed Jan. 9, 1962, Ser. No. 165,206
Claims priority, application Switzerland Jan. 12, 1961
3 Claims. (Cl. 29—177)

Various methods have been proposed for the manufacture of dials carrying projecting symbols or the like such as applied ornaments. A number of these methods consist in screwing or gluing such symbols to the dial, whereas other methods consist in welding the symbols over the surface of the finished or half-finished dial. The welding may be executed electrically or else by means of supersonic waves or again through a combination of electric energy with supersonic waves.

The present invention has for its object a method for welding projecting symbols over a finished or semi-finished dial, in particular a clockwork dial. According to the method of the invention, welding is obtained by means of a focused beam of atomic particles.

Figure 1:
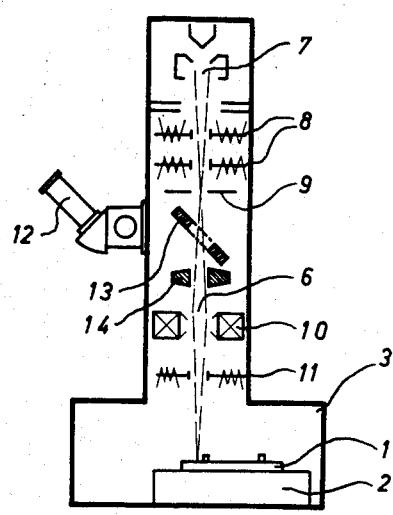
Figure 2:
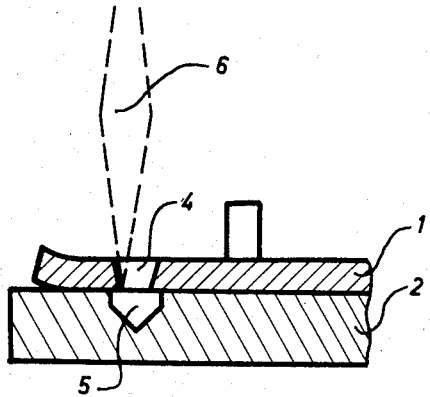

I have illustrated, by way of example, in the accompanying drawings a preferred embodiment of my invention. In said drawings:

FIG. 1 illustrates an electronic welding machine, and
FIG. 2 a dial to be subjected to said welding.

As illustrated, I position the dial 1, facing downwardly, over a rotary plate 2 which is fitted inside the chamber 3 formed in the welding machine. The chamber is subjected to vacuum through a vacuum pump which is not illustrated.

The dial is provided with a number of small spaced apertures or openings 4 which allow a fraction of the under surfaces of the symbols 5 to appear to view when placed in registry therewith. The symbols are arranged inside recesses formed in the rotary plate, so as to allow a beam 6 of electrons to impinge on the symbols and to weld them to the dial. The rotation of the plate allows the successive symbols to pass each in its turn into registry with the electronic beam.

The beam 6 is projected by a cathode 7 constituted by a tungsten wire for instance and is adjusted first by the magnetic field produced by the windings 8 and then it passes through a slot 9, through a magnetic lens 10 and finally across another magnetic field formed by the windings 11.

An eye-piece 12 of an optical observation system is carried in a wall of the chamber 3. The optical system allows checking the actual impact point of the electronic beam. A total reflection prism 13 forms part of the observation system, the objective of which is shown at 14.

Of course, my invention is by no means limited to the embodiment illustrated and, in particular, it is possible, within the scope of the accompanying claims, to execute the welding with other kinds of apparatus or at other points of each symbol and of the dial.

What I claim is:

1. A method for welding symbols on the face of a dial of a watch comprising, providing a dial and at least one symbol to be welded thereon, providing in said dial an aperture having a smaller diameter than an under surface of said symbol, disposing the symbol with said under surface in contact with the face of said dial in a position in which said symbol is to be welded on the face of said dial, and in registry with said aperture, applying a focused beam of atomic particles through said aperture on said under surface of said symbol and a portion of a wall defining said aperture adjacent to an area on said surface onto which said beam is applied thereby to weld the symbol to said face in at least one area of contact between said symbol and said dial face.

2. A method for welding symbols on the face of a dial of a watch comprising, providing a watch dial substantially requiring no further manufacturing operations thereon for finishing it and providing symbols to be welded onto the face of said dial, providing said dial with apertures disposed spaced thereon, disposing an individual symbol with an under surface thereof in registry with a respective aperture and having at least one area in contact with the face of said dial adjacent each respective aperture of said dial, applying a focused beam of atomic particles on a wall surface of the dial defining said aperture and an area on said symbol in contact with said dial face, said beam of atomic particles being applied on an area on said symbol spaced inwardly from the peripheral edges of said symbol, and applying said beam of atomic particles with sufficient intensity and for a sufficient length to weld the individual symbol to said dial face.

3. A method for welding symbols on the face of a dial of a watch comprising, providing a watch dial substantially requiring no further manufacturing operations thereon for finishing it and providing symbols to be welded onto the face of said dial, providing said dial with apertures disposed spaced thereon, disposing the individual symbols with an under surface thereof in registry with a respective aperture and having areas in contact with the face of said dial in individual positions spaced relative to each other and adjacent to said apertures of said dial, applying a focused beam of atomic particles on each of said symbols on said under surface of the symbols and wall surfaces of said dials defining said apertures adjacent said areas in contact with said dial face, said beam of atomic particles being applied to each symbol under surface in an area spaced inwardly from the peripheral edges of each of said symbols, and applying said beam of atomic particles with sufficient intensity and for a sufficient length to weld the individual symbols to said dial face in at least one area on the surface thereof in contact with said dial face and adjacent said area to which said beam of atomic particles is applied thereby to preclude any trace of the welding being seen when said dial face is being viewed in plan.

References Cited by the Examiner

UNITED STATES PATENTS

| 146,236 | 1/74 | De Laforgue | 58—127 |
|---|---|---|---|
| 181,001 | 8/76 | Henderson | 58—127 |
| 1,407,202 | 2/22 | Kubler | 219—127 X |
| 2,196,998 | 4/40 | Lodge | 29—177 |
| 2,301,915 | 11/42 | Harrington. | |
| 2,761,198 | 9/56 | Stern | 29—177 |
| 2,932,720 | 4/60 | Stohr. | |
| 3,047,942 | 8/62 | Schneider et al. | 29—470 |
| 3,049,608 | 8/62 | Greene. | |

FOREIGN PATENTS 188,926   1/37   Switzerland.

JOHN F. CAMPBELL, Primary Examiner.
BEATRICE H. STRIZAK, Examiner.